United States Patent [19]

Lenz

[11] 4,183,387

[45] Jan. 15, 1980

[54] T-BOLT ADAPTER

[75] Inventor: John O. Lenz, Coon Rapids, Minn.

[73] Assignee: Kurt Manufacturing Company, Inc., Minneapolis, Minn.

[21] Appl. No.: 852,541

[22] Filed: Nov. 17, 1977

[51] Int. Cl.² .................................... F16B 39/00
[52] U.S. Cl. .............................. 151/41.76; 85/1 H
[58] Field of Search ............... 85/9, 1 H; 151/41.76, 151/41.7, 41.75; 248/503.1, 500, 505, 119 R, 670, 646, 662; 51/259, 240 R, 241 R

[56] References Cited

U.S. PATENT DOCUMENTS

| | | | |
|---|---|---|---|
| 1,299,759 | 4/1919 | Neff | 51/259 |
| 2,381,936 | 8/1945 | Sargent, Jr. | 151/41.7 X |
| 2,717,622 | 9/1955 | Flora | 151/41.7 |
| 3,115,177 | 12/1963 | Wisniewski | 151/41.76 |
| 4,117,997 | 10/1978 | Gitzendanner | 248/646 |

FOREIGN PATENT DOCUMENTS 2628324  1/1977  Fed. Rep. of Germany ........ 151/41.76
35323  of 1953  Poland ................................. 151/41.76

Primary Examiner—James T. McCall
Attorney, Agent, or Firm—James R. Cwayna

[57] ABSTRACT

An adapter for converting a standard square headed bolt to a T-Bolt for use with machine tools for holding workpieces to the bed thereof. The adapter includes a fabrication having a capturing area formed by downwardly extending legs of the unit for receiving and retaining the head of a square headed bolt and having transversely directed elements above such capturing area to be received into the guide slot of the machine tool bed. The combination of the capturing area and the transverse elements, with an aperture to pass the shaft of the bolt from the capturing area, provides a means for retaining a square headed bolt within the T-Slot of a machine tool bed such that the same may be used as a tool or workpiece hold down device.

5 Claims, 8 Drawing Figures

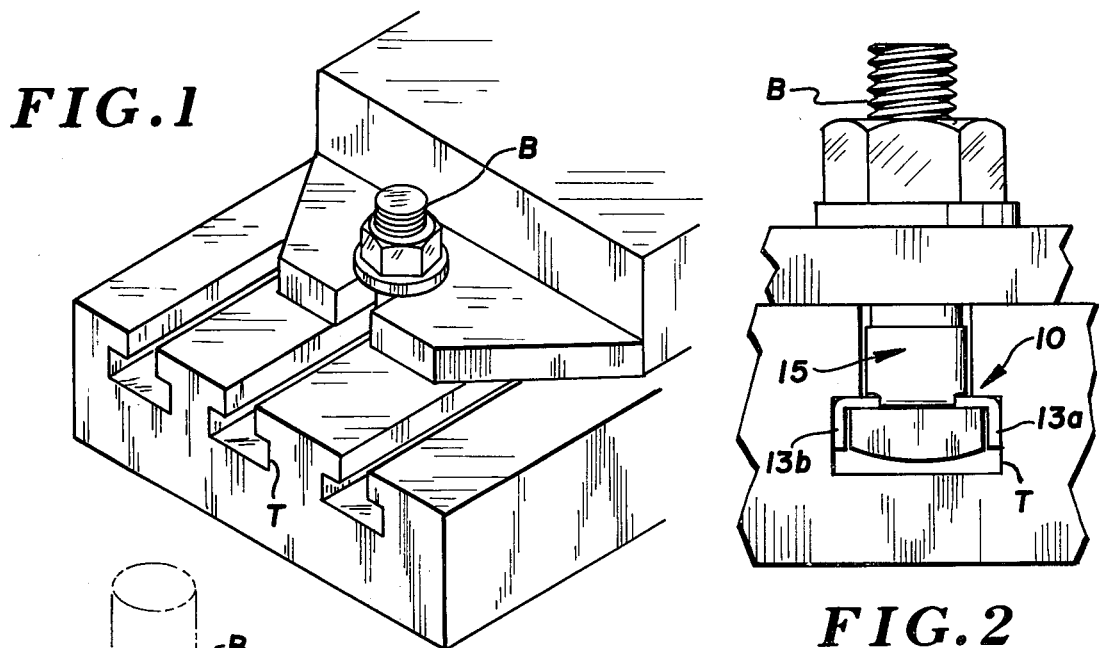
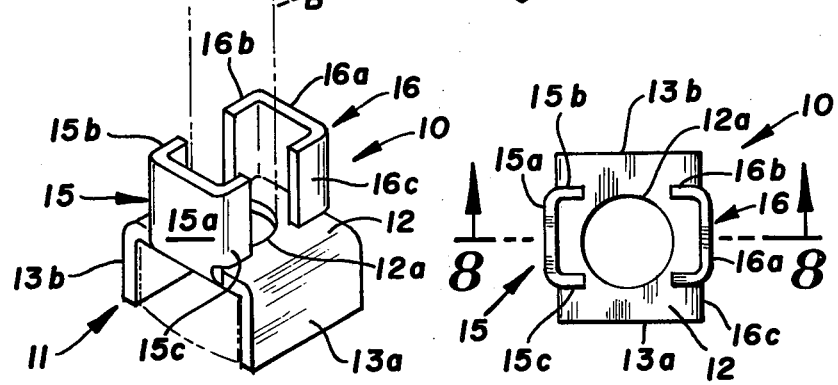
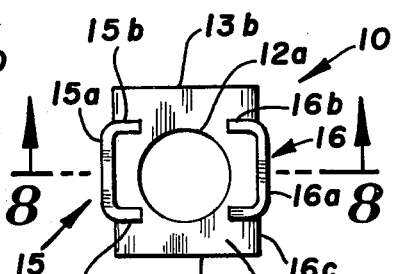
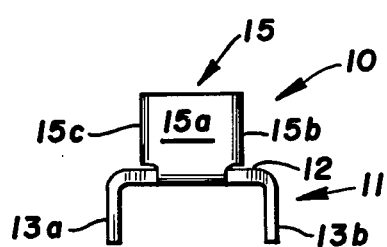
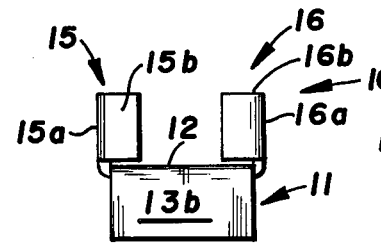
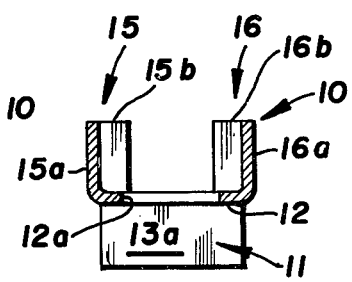
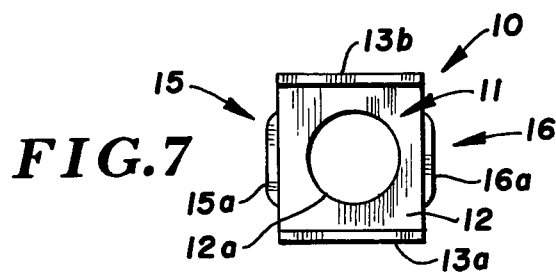

T-BOLT ADAPTER

FIELD OF THE INVENTION

This invention relates generally to machine tools and more particularly to accessories for machine tools and more particularly within the accessory field to tool or workpiece hold down units known specifically as T-Bolts.

BACKGROUND AND OBJECTS OF THE INVENTION

It is well known in the art that many machine tools, such as horizontal and vertical milling machines, grinders and other table or bed tools are provided with inverted T-Slots in the bed portions thereof to permit the mounting of workpieces or holding tools to the bed. It is also well known in the art that T-Bolts, being a bolt with a specifically designed head to be received into the T-Slot, are required for positively holding articles to the table of the machine tool.

The art recognizes the shape and function of such T-Bolts and in the appropriate classes within the United States Patent Office, the applicant has failed to find any prior art patents which provide a bolt device capable of performing the functions of such a T-Bolt which includes a fabricated portion designed to receive a standard square headed or other standard headed bolt such that the same may be received into the T-Slot of a machine tool table. Such a fabrication would include a device which is capable of receiving such a headed bolt and permit the same to be placed and positioned within a T-Slot and prevent either rotation thereof or vertical removal thereof from the slot. The prior art does illustrate fabrications receivable onto the heads of bolts and screws but such devices appear to be limited to head enlargement devices or retaining devices applied to the head which will accommodate the attachment of additional articles to the head. The applicable art in this field appears to be best classified in presently identified Class 85, subclass 9 and Class 151, subclass 41.7.

It is therefore an object of applicant's invention to provide an adapter for a bolt having a standard head shape such as a rectangular or hexagonal head such that the same may be received into the T-Slot of a table of a machine tool for the attachment of workpieces or tools to the table through the use of such bolt.

It is a further object of applicant's invention to provide an adapter device for use in mounting standard bolts into the T-Slots of machine tool tables, which device includes an area for the capturing of the head of the bolt therein.

It is a further object of applicant's invention to provide a fabricated adapter device for use in combination with bolts having a standard head portion said adapter providing a head capturing portion and a pair of upstanding, transversely arranged stop or guide members for guiding within selected portions of the T-Slot of the table.

It is still a further object of applicant's invention to provide a fabricated adapter device for the modification of standard bolts to provide for their use as T-Bolt elements.

These and other objects and advantages of applicant's invention will more fully appear from the accompanying description made in connection with the accompanying drawings in which the same numeral is used to identify the same or similar parts throughout the several views, and in which:

FIG. 1 is a perspective view of a typical machine tool table having an element mounted thereon and illustrating the uppermost portion of a T-Bolt embodying the concepts of applicant's invention being received and located into a T-Slot thereof;

FIG. 2 is an end view of the T-Slot of FIG. 1 in which the T-Bolt concept of applicant's invention is placed and in use;

FIG. 3 is a perspective top view of the T-Bolt adapter element embodying the concepts of applicant's invention and illustrating a square headed bolt therein, the bolt being shown in phantom lines;

FIG. 4 is a top plan view of the adapter;

FIG. 5 is a view from one end of the adapter;

FIG. 6 is a view from one side of the adapter shown in FIG. 5;

FIG. 7 is a bottom plan view thereof; and,

FIG. 8 is a vertical section taken substantially along Line 8—8 of FIG. 4.

In accordance with the accompanying drawings, applicant's adapter device for retaining a bolt having a standard head thereon such that the same may be used in a T-Slot of a table of a machine tool is generally designated 10 with the bolt being retained thereby being designated B with the T-Slot into which the adapter and bolt are placed being designated T.

As commonly known in the machine tool trades, a T-Slot provides a means for anchoring elements to the table or bed of a machine tool and these slots normally extend the length of the table and take the shape of an inverted T. The concept of such a slot is known and is obviously to provide a positive ledge against which elements may be tightened to the table and the slot elements provide a means for retaining the bolt placed therein against rotation such that a nut may be threaded upon the upwardly or outwardly extending shaft of the bolt. Applicant's primary object of this application and invention is to provide an adapter which will permit the use of bolts having standard heads as T-Bolts and thereby eliminate the need for a bolt having a specifically designed head. Such T-Bolts are expensive and their elimination would reduce capital tool expenditures as compared to the expense of a standard head bolt and applicant's adapter.

In the form shown, applicant's adapter 10 includes a head capturing area 11 which is defined by a generally flat plate portion 12 and a pair of downwardly directed leg elements 13a, 13b. The size of the plate portion 12 and the distance between the leg elements 13a, 13b is determined to receive the head of the selected bolt therein and therefore this distance must be slightly greater than the distance across the flats of the bolt head. As illustrated, the length of the legs 13a, 13b is a matter of choice and it is not necessary that the legs 13a, 13b be equal to the full height of the head of the selected bolt.

It should also be noted that although the applicant has illustrated a bolt having a square head, that heads of other configurations may be selected, the necessary criteria for such selection being that the head have opposite parallel sides such that the same may be received between the legs 13a, 13b.

An aperture 12a is provided through the plate 12 to provide a passage for the threaded shaft of the bolt B and permit the same to extend upwardly therefrom.

The adapter further includes a pair of upstanding ear and guiding members 15, 16 which are arranged transversely with respect to the capturing legs 13a, 13b and are arranged on the sides of the plate portion 12 and are formed to overlie the same. As illustrated, these ear and guiding members 15, 16 each include a formed, bifurcated member consisting of a transversely extending element 15a, 16a and a pair of inwardly directed leg elements 15b, 15c and 16b, 16c. The legs 15b, 15c and 16b, 16c are directed inwardly toward the aforementioned aperture 12a and this upstanding member will be received into the smaller, upstanding portion of the T-Slot and will guide on the vertical surfaces thereof. The height of the ear and guiding members 15, 16 is selected such that the entire fabricated unit 10 will not extend upwardly through the table.

As illustrated, the entire unit 10 may be fabricated from a single piece of material through a stamping process which will provide the necessary cuts between the downwardly and upwardly directed sections leaving the same joined on opposite edges of the flat plate section 12. Further forming steps will bring the capturing legs 13a, 13b downwardly and the inwardly directed legs 15b, 15c, and 16b, 16c upwardly with the final forming being to bring the entire ear and guiding sections 15, 16 upwardly to thus direct the legs inwardly toward the bolt receiving aperture 12a.

The unit 10, could be formed through machining or welding techniques without departing from the scope of the invention which, basically, is to provide a means for capturing the head of a bolt to prevent rotation thereof and to retain the same in the enlarged portion of the T-Slot of a machine tool with a second section thereon designed to be received in the smaller section of the T-Slot, the second section being offset with relation to the capturing portion and the offset providing a vertical ledge to prevent vertical removal thereof from the T-Slot into which the unit has been received.

In keeping with this basic concept of the unit, it should be obvious that the particular form of the unit illustrated may be modified without departing from the scope of the invention. As illustrated, the capturing section is arranged transversely to the ear and guiding members. It should be obvious that this particular transverse relation is not necessary as long as the functions of the members is retained. The capturing section provides a means to capture the head of a bolt and the ear or guiding members are retained in and guided upon the smaller portion of the T-Slot. Between these sections, the flat plate provides a vertical stop shoulder. Should a weldment be utilized, it should be obvious that the downwardly extending ears of the capturing section could be in alignment with the ear or guiding members, if the shoulder were provided.

Applicant's device provides a simple, unique arrangement that will lend to a fabricated structure with the primary principle behind the invention being to provide a replacement for the now formed, solid unit T-Bolts.

What I claim is:

1. A T-Bolt adapter device arranged and constructed to receive and retain the head of a bolt therein for placement of the same into the anchoring T-Slot of a machine tool table or the like, said adapter including:
   a. a capturing section having at least one extending head engaging element, said engaging element preventing relative rotation of the bolt engaged thereby, said capturing element arranged to be received into the enlarged portion of the T-Slot of the table;
   b. a plate member fixedly attached to said capturing section to provide a shoulder adjacent thereto, said plate member having aperture means defined thereby for passing the shaft portion of a bolt therethrough;
   c. said capturing section including a pair of extending head engaging elements, the distance between such elements selected to engage opposite flat portions of the head of a bolt received therein;
   d. said plate member extending between said head engaging elements and providing an aperture generally centrally thereof for passing the shaft of a bolt therethrough; and,
   e. at least one oppositely extending guiding ear arranged on said plate member, the dimension of said guiding ear permitting the same to be received into the smaller portion of the T-Slot and at least one guiding element arranged on said guiding ear and directed toward said aperture means for guiding upon the smaller portion of the T-Slot of the machine tool table.

2. The structure set forth in claim 1 and at least a pair of oppositely extending guiding ears arranged on said plate member, said guiding ears being arranged on opposite sides of said plate member and extending oppositely from said capturing section.

3. The structure set forth in claim 2 and said guiding ears being provided with inwardly directed leg elements, the dimension across said leg elements permitting the same to be received into the smaller portion of the T-Slot.

4. The structure set forth in claim 2 and said guiding ears and said legs thereon being arranged transversely to said head engaging element.

5. The structure set forth in claim 4 and the article as defined therein being formed from a stamped, formed plate element.

* * * * *